US012502335B1

(12) United States Patent
Hall

(10) Patent No.: US 12,502,335 B1
(45) Date of Patent: Dec. 23, 2025

(54) BABY-FEEDING COLLAR WITH MAGNETIC ATTACHMENT MEANS

(71) Applicant: Dallas Hall, Dorado, PR (US)

(72) Inventor: Dallas Hall, Dorado, PR (US)

( * ) Notice: Subject to any disclaimer, the term of this patent is extended or adjusted under 35 U.S.C. 154(b) by 0 days.

(21) Appl. No.: 18/323,299

(22) Filed: May 24, 2023

(51) Int. Cl.
*A61J 9/06* (2006.01)

(52) U.S. Cl.
CPC ........... *A61J 9/0684* (2015.05); *A61J 9/0638* (2015.05); *A61J 9/0676* (2015.05)

(58) Field of Classification Search
CPC ....... A61J 9/0684; A61J 9/0638; A61J 9/0676
See application file for complete search history.

(56) References Cited

U.S. PATENT DOCUMENTS 9,157,573 B1 * 10/2015 Zach ...................... B60N 3/102
10,307,006 B2 * 6/2019 Knoll ........................ B67B 7/16
D913,640 S * 3/2021 Irvin .............................. D2/857
11,420,807 B2 * 8/2022 Adjeleian .......... B65D 23/0842
2004/0021049 A1 * 2/2004 Payne .................... B60N 3/103 248/311.2
2005/0056655 A1 * 3/2005 Gary ...................... B65D 25/24 220/737
2006/0124526 A1 * 6/2006 Flick ........................ C12H 1/16 215/386
2008/0290225 A1 * 11/2008 Mostert ................. A61J 9/0638 248/102
2011/0233354 A1 * 9/2011 Mitchell ............ A47G 23/0225 29/428
2014/0360967 A1 * 12/2014 Viscomi ................ A61J 9/0638 215/11.1
2023/0084084 A1 * 3/2023 Ycas ........................ B62J 11/04 248/311.2

* cited by examiner

*Primary Examiner* — Amy J. Sterling
(74) *Attorney, Agent, or Firm* — Steven Rinehart

(57) ABSTRACT

A baby-feeding device having a flexible, polymeric band adapted to circumscribe a feeding-implement such as a bottle, the device consisting of two or three magnets in contact with the shirt of a wearer, the magnets adapted to collectively form a magnetic fit binding the collar and shirt.

7 Claims, 4 Drawing Sheets

BABY-FEEDING COLLAR WITH MAGNETIC ATTACHMENT MEANS

FIELD OF THE INVENTION

This invention relates to baby and infant feeding devices and more particularly relates to a holder for securing a baby bottle in place against a parent's chest during feeding.

BACKGROUND

Description of the Related Art

Parents and caretakers of babies find they must feed babies and infants by hand often using a bottle. This often requires the parent or caretaker to hold the baby with one arm while feeding the baby with the other, leaving the parent unable to perform other tasks by hand while feeding. Without manual feeding, the child may drop the bottle and resume crying. The hold a baby, a parent must often contort their body in a physically straining position to support the bottle.

The art contains many examples of baby bottle supports which are not convenient for either the baby or parent. The bottle holders of the prior art are not adapted to changing positions of the babies or parent's arms, and some are adapted only for babies of a certain size and age.

Many prior art baby bottle holders are adapted only for one size of bottle or feeder. Because baby bottles come in a wide variety of bottles and bottle shapes, the devices are not efficient. Accordingly, a parent may be required to have several different baby bottle holders, which is also not efficient.

There is a need for a baby bottle holder which overcomes these difficulties with the prior art.

SUMMARY

From the foregoing discussion, it should be apparent that a need exists for a baby-feeding collar with magnetic attachment means. Accordingly, the present invention has been developed to provide a baby-feeding collar, the device comprising: an uninterrupted, flexible, polymeric band adapted to circumscribe a feeding implement and form a friction fit therewith; a first magnet affixed to an interior surface of the band; a second magnet adapted to affix to an exterior surface of shirt in magnetic attraction with a third magnet; a third magnet positioned interiorly to the third, the third magnet in magnetic attraction with the second magnet; the device of claim 1, further comprising a base comprising an inner annular sidewall and an outer annular side, a recess forming between the inner annular sidewall and the outer annular sidewall for receiving a lower lip of the glass tank.

The baby-feeding implement may comprise a bottle. The magnets may be circular in some embodiments. The device may further comprise a bottle having a nipple.

A second baby-feeding collar, the device consisting of: an uninterrupted, flexible, polymeric band adapted to circumscribe a feeding implement and form a friction fit therewith; a first magnet affixed to an interior surface of the band; a second magnet adapted to affix to an exterior surface of shirt in magnetic attraction with a third magnet; a third magnet positioned interiorly to the third, the third magnet in magnetic attraction with the second magnet; the device of claim 1, further comprising a base comprising an inner annular sidewall and an outer annular side, a recess forming between the inner annular sidewall and the outer annular sidewall for receiving a lower lip of the glass tank.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

It is an object of the present invention to provide a

For the purposes of this invention, the terms "cartridge," "tank" and "reservoir" are synonymous and interchangeable.

Figure 1A:
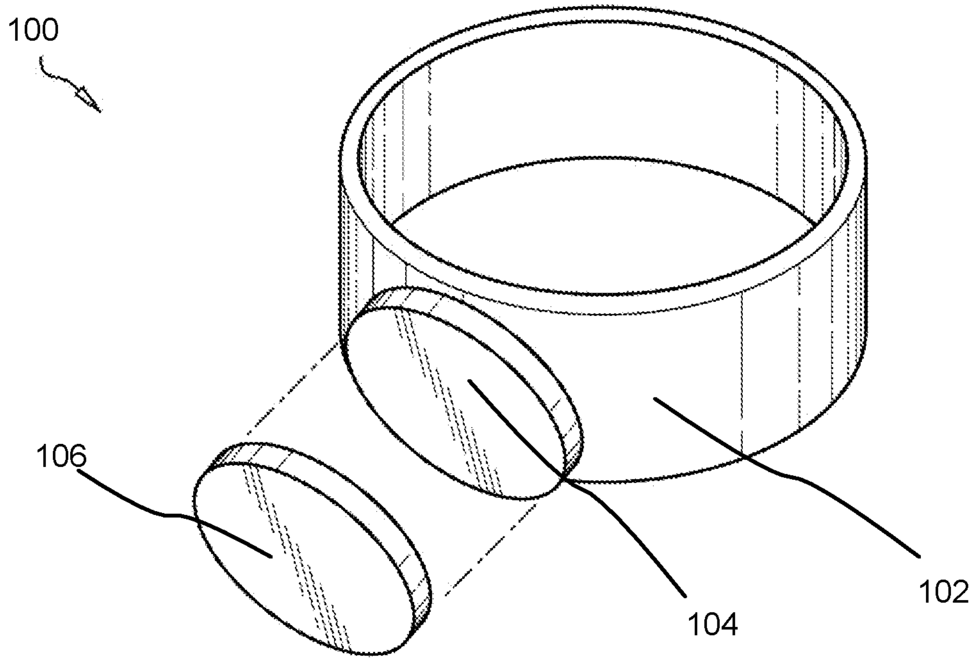
FIG. 1A is a side perspective view of a baby-feeding collar with magnetic attachment means in accordance with the present invention.

FIG. 1A is a side perspective view of a baby-feeding collar with magnetic attachment means 100 in accordance with the present invention.

In various embodiments, the device 100 comprises an uninterrupted band 102 formed from a flexibly polymeric material, the band adapted to circumscribe an exterior surface of a feeding bottle 202.

In various embodiments, an exterior surface 110 of the band 102 is affixed using means known to those of skill in the art to a magnet 104. The magnetic 104 may be adhered to the band 102 or may be inserted into a pocket forming on the band 102. In various embodiments, the magnetic 104 is circular, but may be square, rectangular, ovoid or irregularly-shaped.

In various embodiments, the magnet 104 is inserted into a pocket forming on the band 102. The magnet may be detachably or permanently inserted into this pocket. The band 102 may comprise the pocket or define it. The pocket may be cut using means known to those of skill in the art into the band 102.

In some embodiments, the magnet 104 is not magnetized, but simply comprises or consists of a ferromagnetic material, such as iron, nickel, cobalt or an alloy.

The magnetic dipoles of each magnet 104, 106, 108 may be diametrically opposed to ensure attraction between each of the magnets 104, 106, 108 and an adjacent magnet.

In various embodiments, the magnet 106 is detached from the magnet 104 and inserted interiorly into the shirt 304 of a wearer's 302. The band 102 is then stretched around a bottle or feeding implement 202 and affixed to the wearer's 302 shirt 304, allowing hands free, or semi-hands free, feeding on an infant 308.

Figure 1B:
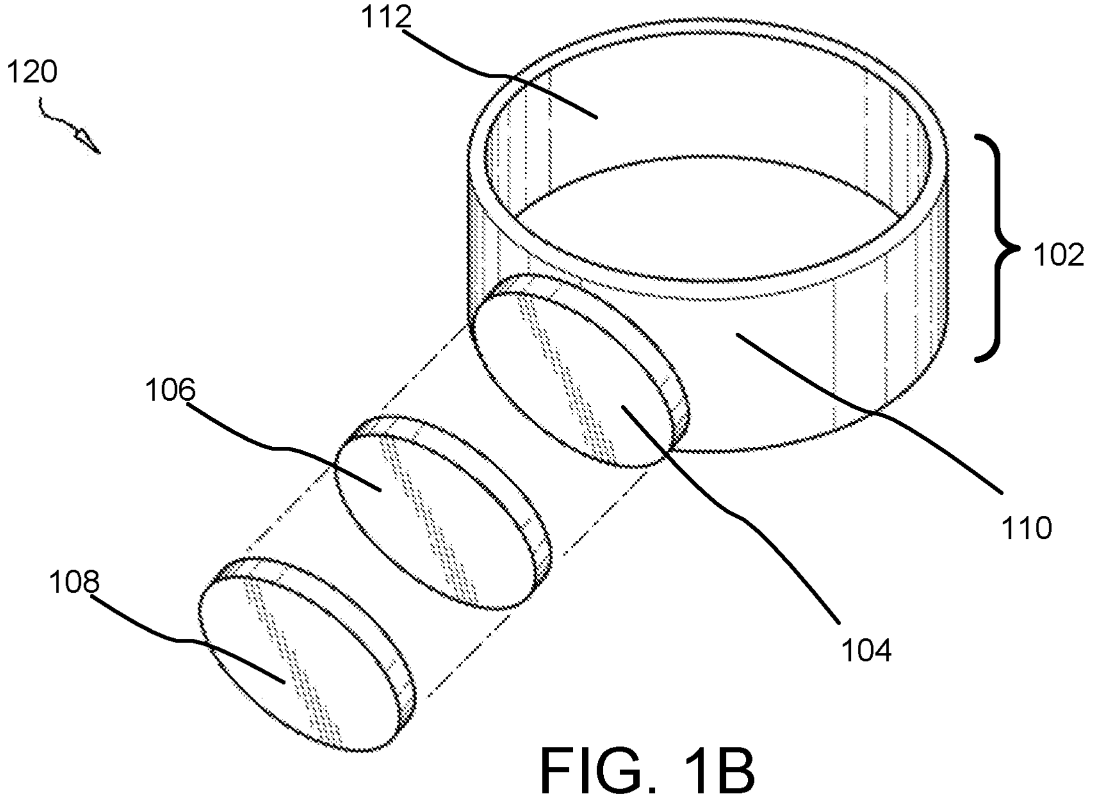
FIG. 1B is a side perspective view of a baby-feeding collar with magnetic attachment means in accordance with the present invention.

FIG. 1B is a side perspective view of a baby-feeding collar with magnetic attachment means 120 in accordance with the present invention.

In the shown embodiment, the device 120 comprises or consists of three magnets 104, 106, 108. The magnet 104 is affixed to the band. The magnet 108 is affixed interiorly to a shirt 304 and the magnet 106 is affixed exteriorly to a shirt 304 such that the magnet 106 secures both the shirt 304 and the band 102 within a magnetic field.

Figure 1C:
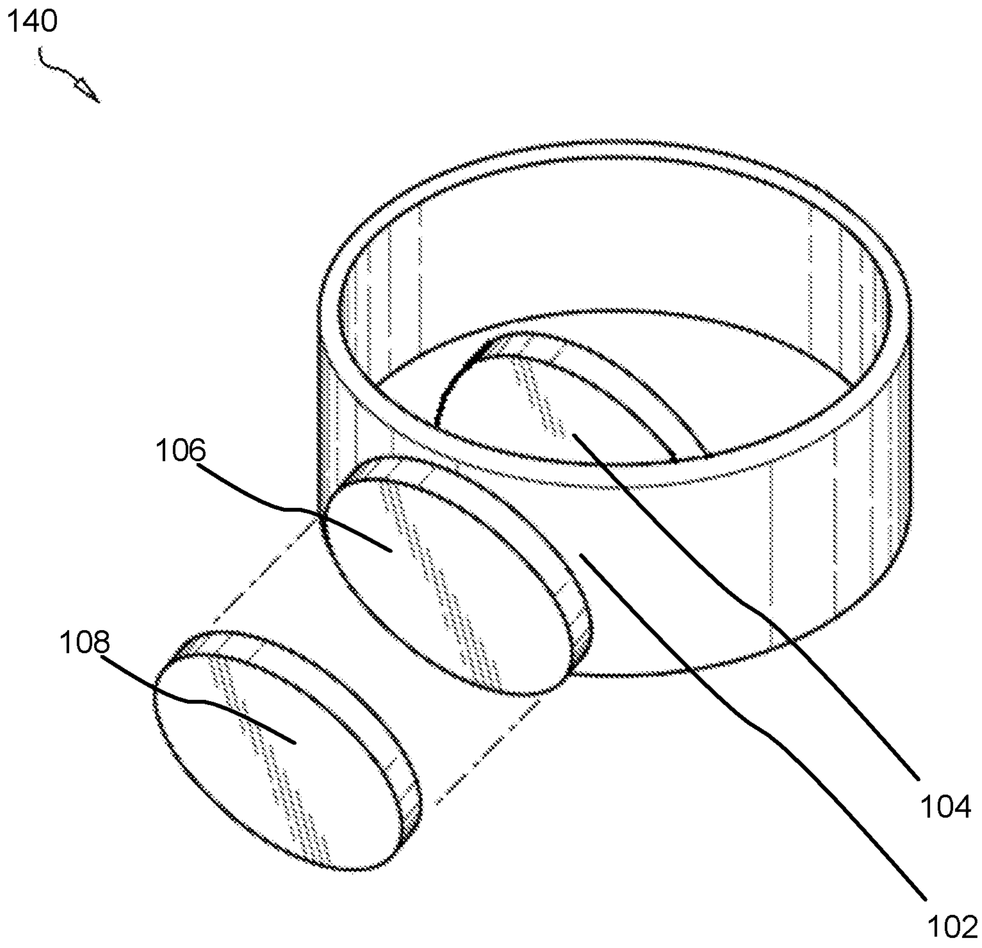
FIG. 1C is a side perspective view of a baby-feeding collar with magnetic attachment means in accordance with the present invention.

FIG. 1C is a side perspective view of a baby-feeding collar with magnetic attachment means 140 in accordance with the present invention.

The magnet 104 may be affixed to an interior surface 112 of the band 102. In this manner, the magnetic 104 bindings the band 102 within the magnetic field formed between the magnet 106 and the magnet 104—helping secure the band 102 and attached feeding implement 202 in place.

Figure 2:
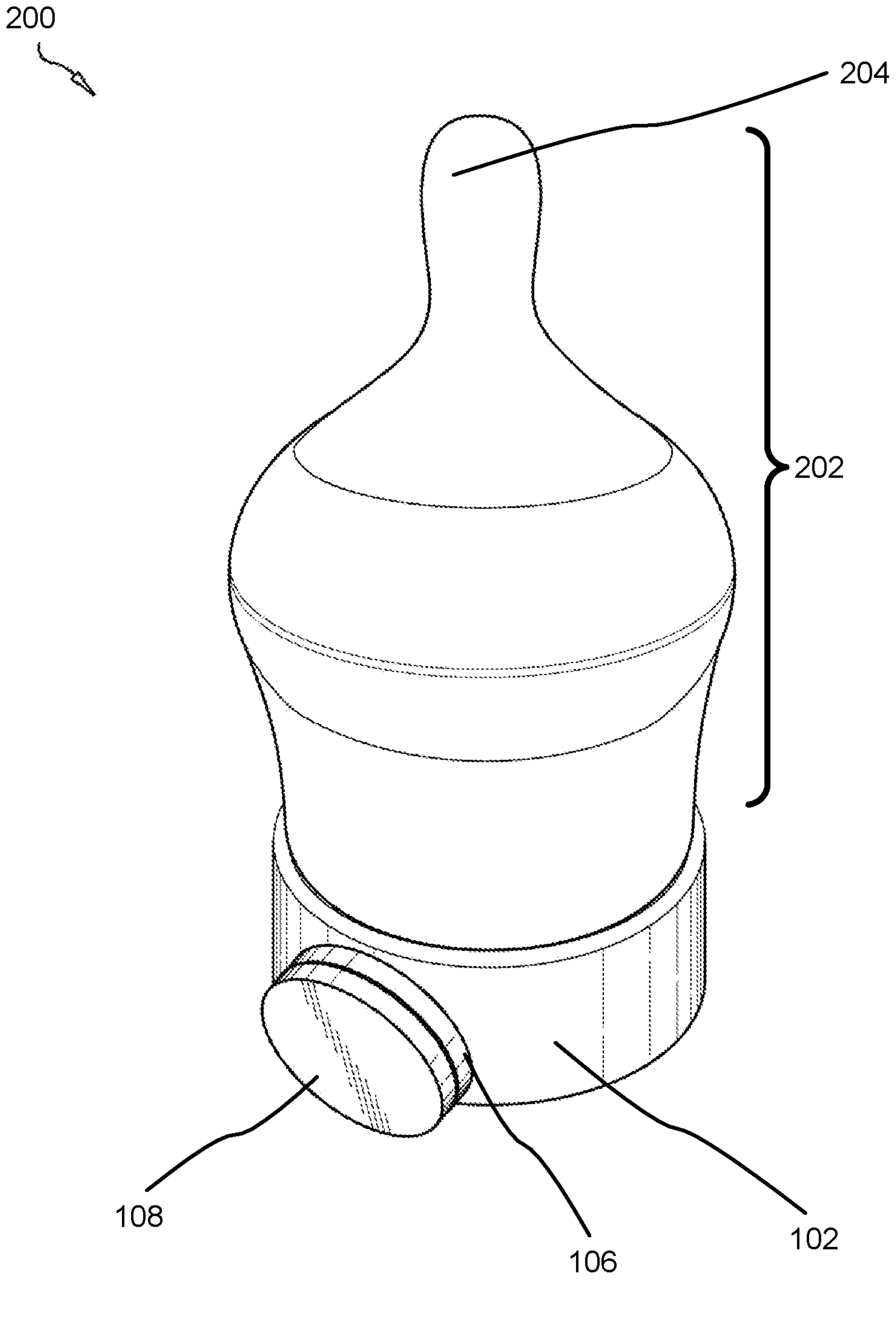
FIG. 2 is a side perspective view of a baby-feeding collar with magnetic attachment means in accordance with the present invention.

FIG. 2 is a side perspective view of a baby-feeding collar with magnetic attachment means in accordance with the present invention.

In various embodiments, a bottle 202 or feeding-implement is included in the device 120. This bottle 202 may comprise a nib 204. The band 102 may adapted to fix, or stretch, around a wide-array of bottles 202 of differing diameters.

Figure 3:
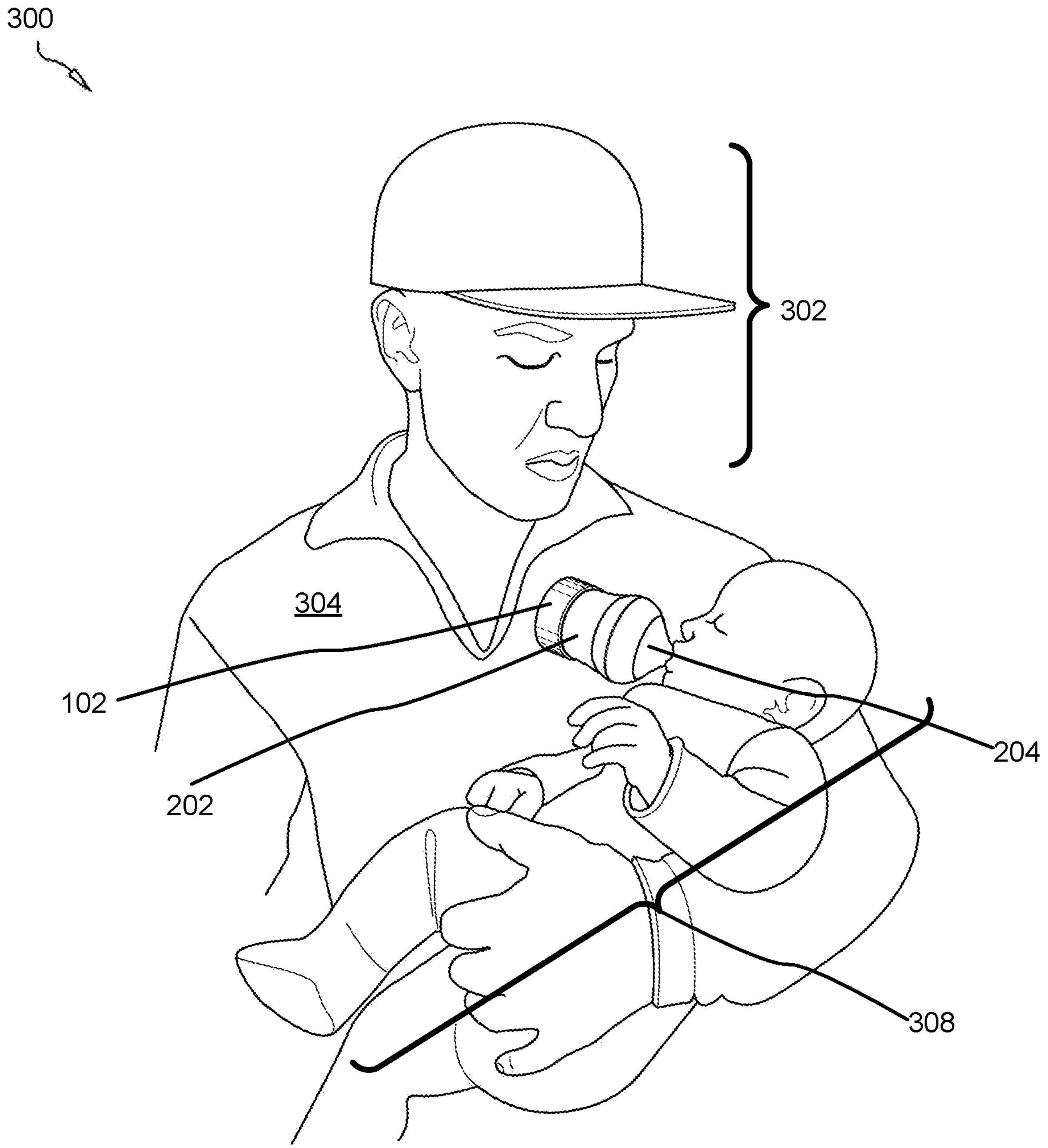
FIG. 3 is an environmental, side perspective view of a baby-feeding collar with magnetic attachment means in accordance with the present invention.

FIG. 3 is an environmental, side perspective view of a baby-feeding collar with magnetic attachment means in accordance with the present invention.

The wearer 302 is able to secure the baby 308 with a single hand which is freed from having to secure the bottle 202.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A baby-feeding collar operable to detachably secure a bottle to a shirt, the device comprising:
- an uninterrupted, flexible, polymeric band adapted to circumscribe a feeding implement and form a friction fit therewith;
- a first magnet affixed to an interior surface of the band;
- a second magnet adapted to affix to an exterior surface of a shirt, the second magnet in magnetic attraction with a third magnet and the first magnet;
- a third magnet positioned interiorly to the shirt, the third magnet in magnetic attraction with the second magnet.

2. The device of claim 1, wherein the baby-feeding implement comprises a bottle.

3. The device of claim 1, wherein the magnets are circular.

4. The device of claim 1, further comprising a bottle having a nipple.

5. A baby-feeding collar operable to detachably secure a bottle to a shirt, the device consisting of:
- an uninterrupted, flexible, polymeric band adapted to circumscribe a bottle and form a friction fit therewith;
- a first magnet adhered to an interior surface of the band within a pocket;
- a second magnet adapted to affix to an exterior surface of shirt, the second magnet in magnetic attraction with a third magnet and the first magnet;
- a third magnet positioned interiorly to the shirt, the third magnet in magnetic attraction with the second magnet.

6. The device of claim 1, wherein the magnets are circular.

7. The device of claim 1, further comprising a bottle having a nipple.

* * * * *